Aug. 7, 1945.  C. W. MOTT  2,381,552
AGRICULTURAL IMPLEMENT
Filed Oct. 25, 1941   2 Sheets-Sheet 1

Inventor:
Carl W. Mott.
By Paul O. Pippel
Atty.

Aug. 7, 1945.                    C. W. MOTT                    2,381,552
                          AGRICULTURAL IMPLEMENT
                          Filed Oct. 25, 1941          2 Sheets-Sheet 2
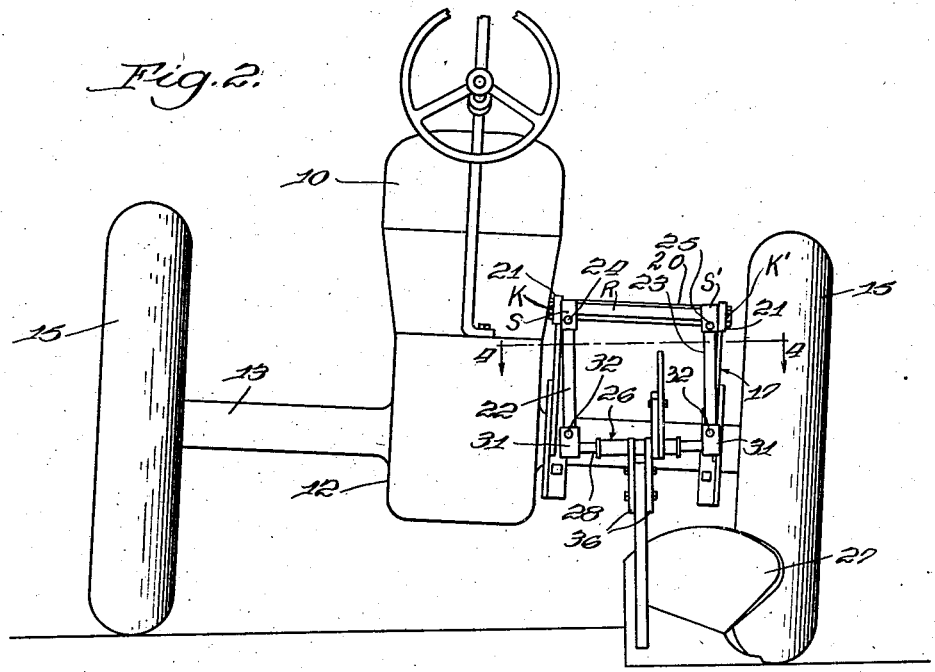
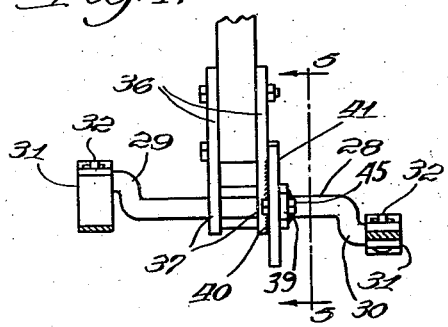
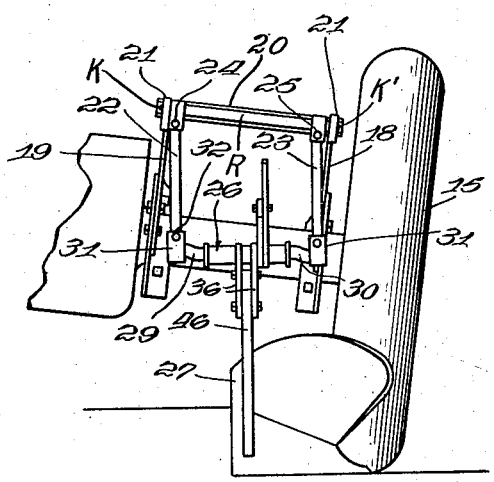
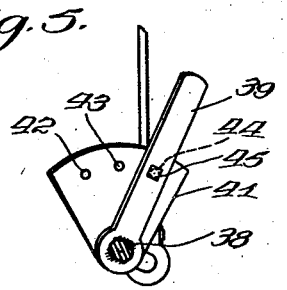
Inventor:
Carl W. Mott.
By Paul O. Pippel
Atty.

Patented Aug. 7, 1945

2,381,552

UNITED STATES PATENT OFFICE 2,381,552

AGRICULTURAL IMPLEMENT

Carl W. Mott, La Grange, Ill., assignor to International Harvester Company, a corporation of New Jersey Application October 25, 1941, Serial No. 416,555

10 Claims. (Cl. 97—47)

This invention relates to agricultural implements and more particularly to means for leveling working tools or plow bottoms in their working position.

It is an object of the present invention to provide a simple means for attaching a working tool or plow bottom to a tool-supporting means, wherein an adjustment may be made for laterally leveling the working tool or plow bottom.

It is another object of the invention to provide a leveling means which has particular use in implements of the type where the working tool is to have free lateral swinging movement.

According to the present invention, the leveling means comprises an eccentrically adjustable means in the form of a transversely extending element having a crank at opposite ends of the same. The cranked ends of the element are in turn respectively connected to laterally spaced and swingable links forming a part of the tool-supporting means. The plow bottom is connected to the eccentric means intermediate the ends of the same, and when the eccentric means is rotated, the plow bottom is laterally leveled for proper alinement with the ground.

For other objects and for a better understanding of the invention, reference may be had to the following detailed description taken in connection with the accompanying drawings, in which:

Figure 2 is a rear elevational view of a tractor and of the implement with its plow bottom in the ground at a minimum working depth;

Figure 3 is a view similar to Figure 2 showing the plow bottom in the ground at a greater or maximum working depth and with the tractor tilted to a greater degree;

Figure 4 is an enlarged detailed view of the eccentric leveling means taken along the lines 4—4 of Figure 2; and Figure 5 is a detailed enlarged view of the manual adjusting means used for rotating the crank-shaft.

Figure 1:
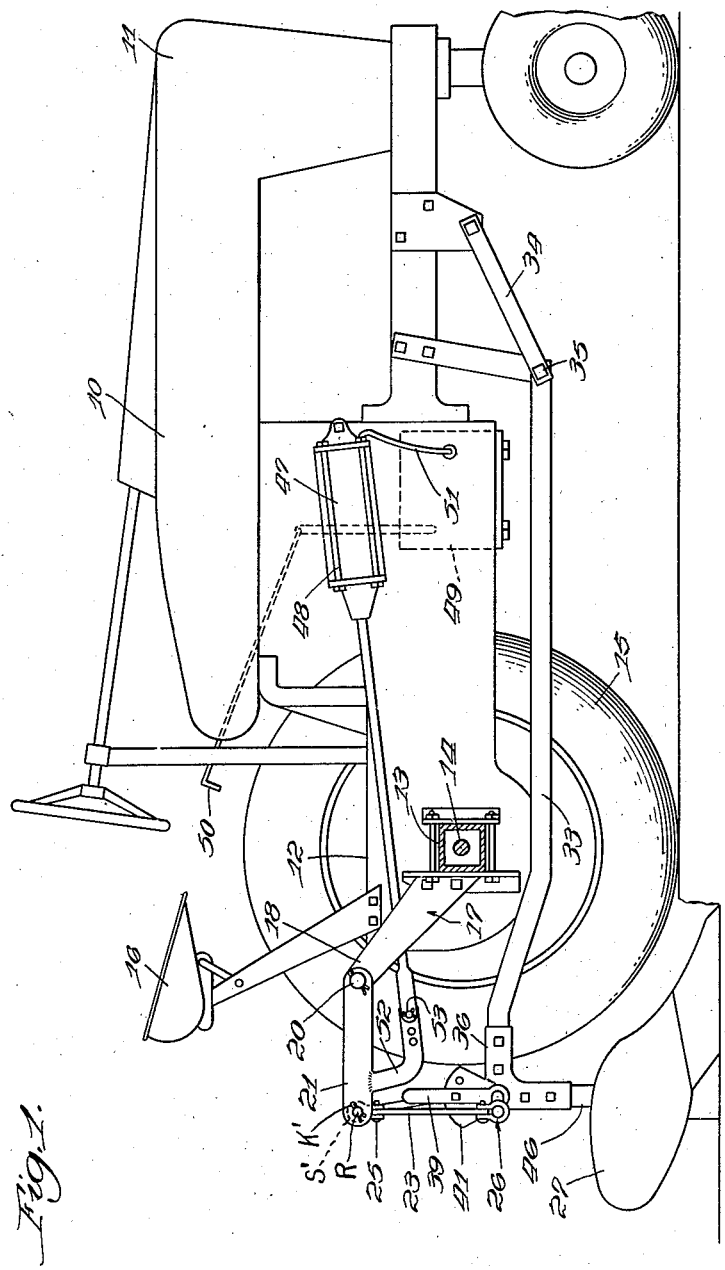
Figure 1 is a side elevational view of a tractor with one of its rear wheels removed and showing the implement attached thereto embodying the feature of the present invention.

Referring now particularly to Figures 1 and 2, there is shown generally a tractor 10 having a forward portion 11 and a rearward portion 12 with a rear axle structure 13 thereon. Extending through the rear axle structure is a rear axle drive shaft 14 for driving the rear traction wheels 15. On the rear portion 12 of the tractor is an operator's station 16. Connected to the rear axle structure 13 at the right side of the tractor is a supporting bracket structure 17. This bracket structure includes a pair of vertically extending supporting members 18 and 19 transversely alined with respect to each other and having pivoted in their upper ends a shaft 20. This shaft 20 has journaled to the same a pair of rearwardly extending lifting arms 21 laterally spaced on the shaft. The outer ends of these arms 21 support, respectively, the depending supporting links 22 and 23. These supporting links have free lateral swinging movement with respect to the lifting arms 21. Such lateral swinging of the links 22 and 23 is accommodated by supporting pivot pins 24 and 25 therefor which are carried in the free ends of saddle straps S and S' embracing opposite end portions of a transverse carrier rod R therefor pivotally mounted in the rear ends of the arms 21. Cotter keys K and K' prevent the loosely mounted rod R from slipping out of the arms 21. This pivot mounting of the rod facilitates forward swinging of the links 22 and 23 when the implement is raised to transport position as explained hereinafter, and this provision of fore and aft swinging movement for the links, together with the lateral swinging about the pivot pins 24 and 25, causes each link 22 and 23 to universally pivotally depend from its mounting. Extending between the lower ends of the supporting links 22 and 23 is an eccentric means 26 serving as means for the connection of a plow bottom 27 to the supporting links 22 and 23.

Referring now particularly to Figure 4, it will be noted that this eccentric means 26 takes the form of a double crank element 28 having on opposite ends of the same the opposing cranks 29 and 30. These cranks are in turn connected to the lower ends of the swingable links by the bearing elements 31 pivoted as indicated at 32, respectively, to the laterally swingable links 22 and 23.

The plow bottom has a draft beam structure, indicated generally at 33, which extends under the rear axle structure 13 and forwardly for connection with the forward portion 11 of the tractor. The connection of the beam structure 33 with the forward portion of the tractor 11 is made by means of a draft bracket structure 34, and the connection of the beam with the structure, as indicated at 35, is to permit vertical movement of the beam structure and to allow for some degree of lateral swinging movement of the beam 33. In other words, the manner of connecting the beam 33 with the draft bracket structure 34 is that of a loose connection. The draft beam 33 has angled-shaped plates 36 at its rearward end to the vertical extending portion of which is connected the plow bottom 27. These plates 36 have openings therethrough, as indicated at 37, in which is journaled the double crank element 28.

Referring now particularly to Figure 5, it will be noted that there is rigidly and weldedly secured to the double crank element 28, as indicated at 38, an adjusting arm 39. When this arm 39 is rotated, the cranked element 28 is turned in the journal openings 37 of the plates 36 and in the bearings 31 of the swingable links 22 and 23, respectively. Since the plates 36 are laterally spaced along the element 28, a lateral tilting motion will be imparted to the draft beam 33 and consequently to the plow bottom 27. Rigidly connected to one of the plates 36 by welding, as indicated at 40, is a plate 41 having holes 42, 43, and 44 therein. This plate is in alinement with the adjusting arm 39 and by the use of a bolt means 45, extending through any one of the openings 42, 43, and 44 and through the arm 39, the crank element 28 is retained in its rotatably adjusted position.

When the plow bottom is in its normal plowing depth position, the arm 39 will be located so that the bolt means 45 will extend through the intermediate opening 43 of the plate 41. When the plow bottom is in the position shown in Figure 3, that is, when the same is in its maximum depth plowing position, the lever 39 would be in a position to be retained by a bolt means extending through the hole 42 in the plate 41. When the plow is in its minimum plowing position, as shown in Figure 2, the arm will take the position shown in Figure 5, and the bolt means 45 will extend through the opening 44. During these adjustments, one of the plates 36 of the draft beam will be either raised or lowered while the other plate 36 will be respectively lowered or raised. This motion is imparted through a vertically extending element 46 forming a part of the draft beam 33 to the plow bottom 27.

It should be noted that this eccentric means 26 is connected between the plow beam 33 forming part of the working-tool structure and a tool-supporting means which may be said to include the tractor, the bracket structure 17, the arms 21, and the links 22 and 23. In Figures 2 and 3, it is noted that one of the tractor wheels 15 travels in a plowed furrow, thereby causing the tractor to be tilted. The depth of plowing will determine the amount of tilting of the tractor thereby varying the amount of adjustment necessary to be given the plow bottom 27 in order to have it properly leveled with the ground being plowed.

Associated with the tractor is a power-lifting arrangement indicated generally at 47 and including a fluid-operated device 48 and a pump and valve control mechanism 49 inserted in the tractor 10. The control mechanism is operated by a rearwardly extending rod 50 accessible to the operator's station 16 to cause fluid to flow through a fluid communication 51 to the fluid-operated device 48 which is in turn connected to a bracket 52 on one of the arms 21, as indicated at 53. As the fluid arrangement is operated, the arms 21 will be given a clockwise movement about the shaft 20, which is imparted through the links 22 and 23 to the plow beam 33, to thereby effect lifting movement of the plow to its transport position on the tractor. A release of the fluid in the fluid device 48 permits the plow to be lowered into its plowing position. It should now be apparent that there has been provided a simple leveling device for direct-connected plows and particularly for direct-connected plows which are connected to the tractor for free lateral swinging movement.

While various changes may be made in the detail construction, it is to be understood that such changes shall be within the spirit and scope of the present invention as defined by the appended claims.

What is claimed is:

1. In combination, a tractor, laterally spaced and laterally swingable supporting links depending from the tractor, a plow bottom, means for connecting the plow bottom to the tractor including a double crank element of which the cranks are spaced axially of such element and are disposed different radial directions therefrom, and said cranks being journaled respectively on depending portions of said links to cause tilting of said element pursuant to its rotation.

2. In combination, a tractor having a forward portion and a rear axle structure, a plow bottom having a longitudinally extending draft beam connected at its forward end to the forward portion of the tractor for free pivotal movement, lifting means on the rear axle structure and laterally spaced and swingable links depending from the lifting means, and means for connecting the draft beam at its rear end to the lifting means including an eccentrically adjustable means extending between the depending laterally swingable links whereby the plow bottom may be laterally leveled.

3. In combination, a tractor having a forward portion and a rear axle structure, a plow bottom having a longitudinally extending draft beam connected at its forward end to the forward portion of the tractor for free pivotal movement, lifting means on the rear axle structure and laterally spaced and swingable links depending from the lifting means, and means for connecting the draft beam at its rear end to the lifting means including a double crank element rotatably adjustable between the free ends of the laterally swingable depending links, the plow beam and plow bottom being connected to the crank element intermediate the ends thereof, whereby upon rotatable adjustment of the crank element the plow bottom may be laterally leveled.

4. In combination, a tool-supporting structure, a ground-working tool structure, and means for connecting the working tool structure to the tool-supporting structure including laterally spaced links swingably depending from the tool-supporting structure, bearings on depending portions of said links, a tool-supporting member having a principal axis about which it is rotatable and also having axially-spaced portions respectively journaled in the bearings on said links and disposed in dissimilar eccentric relation with respect to said axis so that rotation of said member incurs both orbital movement of said journaled portions about said axis and tilting of said member and said axis, and means connecting the tool structure to said member for support therefrom and to cause tilting of said tool structure pursuant to tilting of said member.

5. In combination, a tool-supporting structure having laterally spaced portions, an earth-working tool, and means for connecting the tool to the tool-supporting structure including a member rotatable about an axis extending generally between said portions, and parts upon said member having different eccentric relation with respect to said axis and reactable cooperably respectively with said spaced portions to cause tilting of said member pursuant to rotation thereof, and bearing means connecting the tool with said member to provide for such rotation while causing tilting of said tool with said member as an expedient for leveling said tool.

6. In apparatus for adjustably connecting a ground-working tool structure with a tool-supporting structure therefor in a manner that the tool structure may be leveled, the combination of axially-spaced bearings for support by said tool-supporting structure in dissimilar eccentric relation with respect to the axis along which they are spaced and horizontally adjustable transversely of their axes, a tool-supporting member having portions journaled in said bearings and rotatable about said axis to cause orbital adjustment of said bearings about said axis incident to tilting said member and said axis, and means connecting said tool structure to said member for support therefrom and to cause tilting of said tool structure pursuant to such tilting of said member.

7. In combination; a tool-supporting structure; a working-tool structure; and tool-leveling means connecting the working-tool structure to the tool-supporting structure, including laterally spaced links universally pivotally depending from said tool-supporting structure, and a double crank element having opposite crank ends spaced circumferentially of the longitudinal axis of such element and journaled respectively in depending portions of said links about axes generally parallel with said longitudinal axis of the element, and the working-tool structure being connected to the crank element intermediate its ends whereby upon rotatable adjustment of the crank element about its said longitudinal axis the working-tool structure will be laterally leveled.

8. In combination, a tool-supporting structure, a ground-working tool structure, and means for connecting the working-tool structure to the tool-supporting structure including axially spaced bearings supported on said tool-supporting structure though laterally displaceable with reference to their axes, a rotatable tool-supporting member extending between said bearings and having portions journaled in said bearings so that said member is operable, when rotated, to orbitally adjust said bearings about the axis of rotation of said member and thereby tilt said member, and means connecting said tool structure to said member to cause tilting of said tool structure pursuant to said tilting of said member.

9. In combination, a tool-supporting structure, a ground-working tool structure, means for connecting the working-tool structure to the tool-supporting structure including axially spaced bearings supported on said structure but displaceable transversely of the axis along which they are spaced, and a rotatable double crank element extending between said bearings and having opposite end throw bearings disposed at different positions radially of the axis of rotation of such member and respectively journaled in said bearings, the working-tool structure being connected to the crank element intermediate its ends thereof whereby upon rotation of the crank element the working-tool structure will be leveled with respect to the ground being worked.

10. In combination, a tool-supporting structure, a working tool, and means for connecting said tool to said structure, including a pair of links depending from said structure in laterally spaced relation with respect thereto and swingable fore and aft thereof, bearings in lower portions of said links, and a rigid double crank element having a mid-section extending between said bearings and throw bearings disposed in radial disalinement with respect to said midsection and at opposite ends thereof, said throw bearing being journaled in the link bearings to cause tilting of the crank element pursuant to rotation thereof about the principal axis of its mid-section, and said tool being connected with said crank element mid-section for tilting therewith.

CARL W. MOTT.